Figure 1:
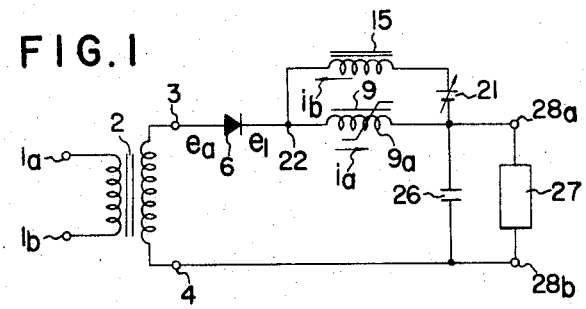

Nov. 14, 1967  TOSHIO KURIMURA  3,353,084
REGULATABLE RECTIFYING APPARATUS
Filed June 24, 1965  4 Sheets-Sheet 4

United States Patent Office 3,353,084
Patented Nov. 14, 1967

3,353,084
REGULATABLE RECTIFYING APPARATUS
Toshio Kurimura, Setagaya-ku, Tokyo-to, Japan, assignor to Kokusai Denshin Denwa Kabushiki Kaisha, Tokyo-to, Japan, a joint-stock company of Japan
Filed June 24, 1965, Ser. No. 466,739
Claims priority, application Japan, June 29, 1964, 39/36,367
12 Claims. (Cl. 321—25)

This invention relates to a rectifying apparatus and more particularly to a rectifying apparatus for producing a regulatable rectified output from an alternating current.

Heretofore, there has been proposed rectifying apparatus capable of regulating the rectified output voltage by utilizing a saturable reactor (or reactors) assuming high impedance or low impedance, against a periodic quantity, in accordance with the non-saturation or saturation of the saturable reactor. In these cases, however, it is generally essential that the saturable reactor have a rectangular hysteresis characteristic whereby the residual magnetic flux density is approximately equal to the saturated magnetic flux density. This condition is difficult to achieve in the manufacturing process since the core of the saturable reactor must be formed into a toroidal shape. Such difficulty becomes more pronounced particularly in the case of a rectifying apparatus with a large power capacity. If a saturable reactor with a cut core can be employed, it is very easy to make the saturable reactor. However, such a saturable reactor with a cut core cannot be employed in the above mentioned conventional rectifying apparatus since it has a large magnetic resistance whereby its residual magnetic flux density is very low.

It is an object of this invention to provide an easily producible rectifying apparatus the rectified output voltage of which is regulatable up to high power capacity.

Another object of this invention is to provide a rectifying apparatus for producing a regulatable rectified output of a substantially constant value at a certain regulated condition.

Said object and other objects of this invention can be attained by a regulatable rectifying apparatus of this invention for producing, from an alternating current, a rectified direct current output by the use of at least one rectifying circuit each of which comprises a series connection of a rectifier element and a main saturable reactor having a non-rectangular hysteresis characteristic, characterized in that the apparatus is provided with, as a by-pass circuit for supplying a demagnetization current of the main saturable reactor during a period in which the rectifier element is non-conductive, at least one control circuit each of which includes a series connection of a non-saturable reactor and a direct-current voltage source having a small internal resistance, whereby the voltage of the rectified direct-current output is regulatable by controlling the voltage of the direct-current voltage source.

Figure 2:
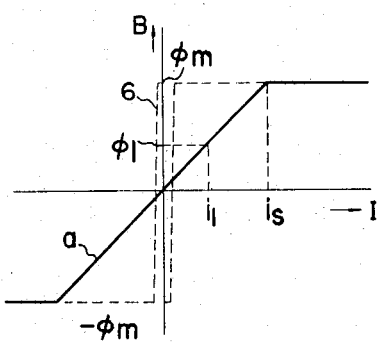

The novel features of this invention are set forth with particularity in the appended claims. This invention, however, as to its construction and operation together with further advantages thereof, may best be understood by reference to the following description, taken in connection with the accompanying drawings in which like parts are designated by like reference characters, and in which:

FIGS. 1, 4, 6, 7, 8, 9, 10, and 12 are schematic connection diagrams of preferred embodiments of this invention;

FIG. 2 shows hysteresis characteristics for a saturable reactor employed in any embodiment of this invention; and FIGS. 3A, 3B, 5A, 5B, 11A and 11B are waveforms for describing operations of embodiments of this invention.

FIG. 1 is a schematic connection diagram of the rectifying apparatus applied to half-wave rectification of a single-phase alternating current. In this embodiment, the alternating current is supplied through a transformer 2 having a primary winding with terminals $1_a$ and $1_b$ and a secondary winding with terminals 3 and 4; a rectifying circuit composed of a series connection of a rectifying element 6 and a winding $9_a$ of a main saturable reactor 9 is connected to the terminal 3; and a series connection of a non-saturable reactor 15 and a direct-current voltage source 21 is connected in parallel with the main saturable reactor 9. The rectified output is applied to a load 27 through output terminals $28_a$ and $28_b$. A smoothing capacitor 26 is connected across terminals $28_a$ and $28_b$.

The main saturable reactor 9 has a hysteresis characteristic representable by curve $a$ shown in FIG. 2 with a heavy line and can be formed by the use of a cut magnetic core having an air gap in the magnetic circuit thereof and having a small coercive force. For simple illustration, the hysteresis loop of the curve $a$ is omitted irrespective of the existence, in practice, of a small hysteresis loop. A hysteresis characteristic loop 6 shown in FIG. 2 with dotted line is of a saturable reactor employed for controlling the rectified output current in a conventional rectifying apparatus.

Figure 3A:
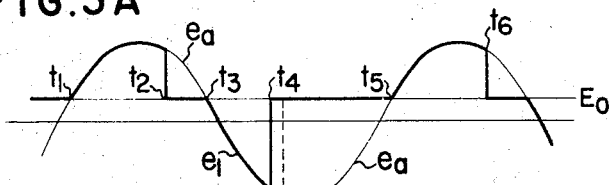
Figure 3B:
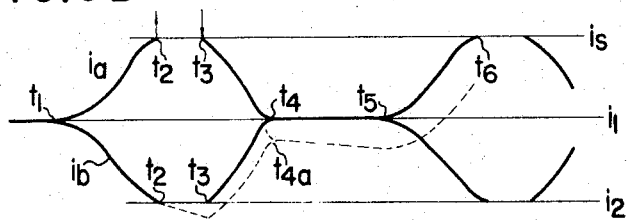

The waveforms shown in FIGS. 3A and 3B are of voltages and currents at various circuit parts for describing the operation of the embodiment in FIG. 1. In these illustrations, it is assumed that the capacitor 26 has a large capacity whereby the ripple voltage in the rectified output can be neglected and that the ohmic resistance of the reactor 9 is zero.

The operation of the apparatus shown in FIG. 1 is as follows. Before a time $t_1$, the rectifier element 6 is is in the non-conductive state, so that a current $i_a$ flowing through the saturable reactor 9 is equal to a current $i_b$ flowing through the reactor 15 if it is assumed that the current $i_b$ flows previously through the reactor 15. (This assumption, that is, that the current $i_b$ flows through the reactor 15, can be readily understood from the description presented below.) Furthermore, it is assumed that the currents $i_a$ and $i_b$ are of a value $i_1$ in such a case and that the voltage of the source 21 is zero. In this case, if the ohmic resistances of reactors 9 and 15 are zero, the current $i_a$ of the reactor 9 continues to flow with the value $i_1$ since there is no electromotive force (EMF) in the loop circuit comprising the reactors 9 and 15 and the source 21. Accordingly, the voltage $e_1$ appearing at a junction 22 between the rectifying element 6 and the reactor 9 is equal to the voltge $E_o$ of the rectified output since no voltage is generated across the reactor 9.

After the time $t_1$, the voltage $e_a$ of the terminal 3 exceeds the voltage $E_o$, so that the rectifier element 6 assumes the conductive state, and the voltage $e_1$ increases in accordance with the increase of the voltage $e_a$. As a result of the increase of the voltage $e_1$, the current $i_a$ increases and the current $i_b$ decreases, as indicated in FIG. 3B. The deviations of currents flowing through reactors are generally equivalent to the deviations of magnetic fluxes of these reactors.

At a time $t_2$ when the magnitude of the current $i_a$ reaches a value $i_s$, the magnetic flux density B becomes equal to the saturated magnetic flux density $\phi_m$ as indicated in FIG. 2, whereby the reactor 9 immediately loses its counter electromotive force. At this time, the voltage $e_1$ is equal to the voltage $E_o$, so that a current of large magnitude flows into the rectifying element 6.

After a time $t_3$, although the voltage $e_a$ becomes lower than the voltage $E_o$, the conductive state of the rectifying element 6 is continued, whereby the voltage $e_1$ coincides with the voltage $e_a$. The reason for this is that the saturable reactor 9 assumes the nonsaturated state when the current $i_a$ is less than the value $i_s$, thereby causing the counter electromotive force of the reactor 9, and that a magnetization current necessary to accompany with the deviation of the counter electromotive force flows into the reactor 9. Since the current $i_b$ is less than the current $i_a$, a difference current therebetween is applied through the rectifying element 6 caused to be in the conductive state.

In a period $t_3$ to $t_4$, the voltage $e_1$ becomes less than the voltage $E_o$, so that the current $i_b$ increases and the current $i_a$ decreases. At the time $t_4$ when currents $i_a$ and $i_b$ are equal, the rectifying element 6 assumes the non-conductive state since the current supply from the rectifying element 6 is unnecessary. In a period $t_4$ to $t_5$, both of the currents $i_a$ and $i_b$ are equal to the value $i_1$, and the reactors 9 and 15 have no counter electromotive force, whereby the voltage $e_1$ is equal to the voltage $E_o$. At a time $t_5$, the operational condition of this apparatus returns to the condition at the time $t_1$. The above described operation is repeated in each period of alternating current to be rectified.

In an actual apparatus, since there exists the ohmic resistances of the reactors 9 and 15 which have been neglected in the above description, the voltage $e_1$ is still higher than the voltage $E_o$ in the period $t_2$ to $t_3$. Accordingly, the current $i_b$ decreases continuously in this period as indicated by dotted line in FIG. 3B. As a result of this phenomenon, the time $t_4$ when the current $i_a$ becomes equal to the current $i_b$ in the demagnetization period is delayed to a time $t_{4a}$, so that the demagnetization quantity of the reactor 6 increases. In the period $t_{4a}$ to $t_5$, the loop current (the current $i_1$) decreases also, so that the time $t_6$ when the reactor 9 is to be saturated is delayed gradually.

After many periods of the operation, the rectified output cannot be derived because of increase of the demagnetization period. Such undesirable decrease of the current $i_o$ caused by the ohmic resistances of the reactors 9 and 15 can be removed by establishment of the voltage $E_s$ of the direct-current source 21 at an appropriate value. In accordance with adjustment of the voltage $E_s$, the loop current $i_1$, which is proportional to the ratio of the voltage $E_s$ to the ohmic resistance $(R_9+R_{15})$ of said reactors 9 and 15, increases or decreases. Since the magnetization and demagnetization quantities of the reactor 9 deviates according to the increase or decrease of the loop current $i_1$, the rectified output voltage $E_o$ can be controlled by the adjustment of the voltage $E_s$ of the source 21.

Figure 4:
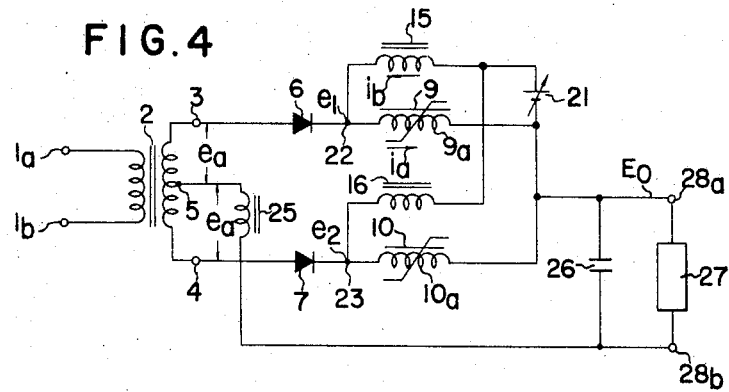

FIG. 4 shows a schematic connection diagram of the rectifying apparatus applied to full-wave rectification of a single phase alternating current which is supplied from the power transformer 2 having a secondary winding with a center terminal 5 other than terminals 3 and 4. In this embodiment, the rectifying means is composed of a pair of series connections each comprising a rectifying element 6 (or 7) and a winding $9_a$ (or $10_a$) of a saturable reactor 9 (or 10). A capacitor 26 and a choke coil 25 form a smoothing circuit. Each of non-saturable reactors 15 and 16 are the same as the reactor 15 shown in FIG. 1. Other components are the same as those shown in FIG. 1.

Figure 5A:
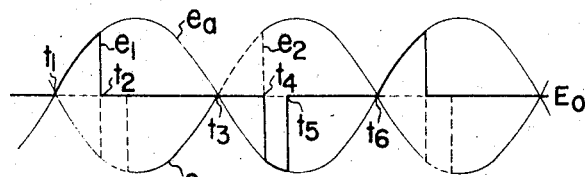
Figure 5B:
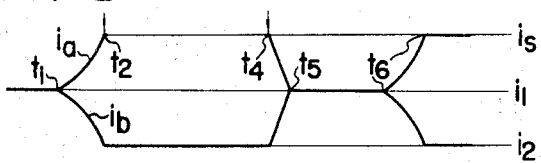

The waveforms shown in FIGS. 5A and 5B are of voltages and currents of various parts of the circuit for describing the operation of the embodiment shown in FIG. 4. In these illustrations, similarly as in the case of the embodiment of FIG. 1, it is assumed, that the capacitor 26 has a large capacity whereby the ripple voltage in the rectified output can be neglected and that the ohmic resistance of the reactor 9 is zero. The operation of the apparatus shown in FIG. 4 is as follows.

Before a time $t_1$, the reactor 10 is saturated, and the rectifying element 7 is conductive with respect to the rectified current. In this condition, the electric potential of the terminal 4 is equal to the voltage $E_o$, and the electric potential of the terminal 3 is lower, by twice the voltage $e_a$ of the alternating-current source, than the voltage $E_o$. Moreover, the rectifying element 6 is non-conductive, and a current $i_a$ flowing through the reactor 9 is equal to a current $i_b$ flowing through the reactor 15. (It is assumed that these currents $i_a$ and $i_b$ are of a value $i_1$.) If the voltage of the source 21 is zero and ohmic resistances of the reactors 9 and 15 are zero, the loop current $i_1$ continues flowing steadily. Accordingly, the voltage $e_1$ (shown by heavy line in FIG. 5A) appearing at a junction 22 between the rectifying element 6 and the reactor 9 is equal to the voltage $E_o$ of the rectified output since no voltage is generated across the reactor 9.

After the time $t_1$, although the voltage $e_a$ of the terminal 3 exceeds the voltage $E_o$, the rectified current still flows through the rectifying element 7 because of the retardation function of the reactor 9 and of the continuation function of the self-inductance of the reactor 15. However, since the rectifying element 6 becomes conductive, the voltage $e_1$ increases in accompaniment with the voltage $e_a$; then the current $i_a$ increases and the current $i_b$ decreases. When the magnetic flux density of the reactor 9, which increases in accordance with the increase of the current $i_a$, is saturated, the counter electromotive force of the reactor 9 is immediately lost, and the voltage $e_1$ becomes equal to the voltage $E_o$. Accordingly, the rectified current commutates from the rectifying element 7 to the rectifying element 6, and the current $i_b$ continues to flow steadily at a value $i_2$ in a period $t_2$ to $t_4$.

After a time $t_3$, the voltage $(-e_a)$ of the terminal 4 exceeds the voltage $E_o$, so that the rectifying element 7 becomes conductive and the voltage $e_2$ (shown by dotted line in FIG. 5A) appearing at a junction 23 between the rectifying element 7 and the reactor 10 varies in accompaniment with the voltage $(-e_a)$. After the time $t_4$ when the reactor 10 is saturated, the rectified current flows separately into two rectifying circuits each composed of of rectifying element 6 (or 7) and the saturable reactor 9 (or 10). The conductive condition of the rectifying element 6 continues to a time $t_5$. The reason for this is that, since the magnetization current of the saturable reactor 9 must be deviated in accompaniment with a magnetization curve, such as the curve $a$ shown in FIG. 2, within the non-saturation region of the reactor, a difference current between currents $i_a$ and $i_b$ is supplied through the rectifying element 6. Accordingly, the voltage $e_1$ coincides with the voltage $e_a$, whereby the current $i_a$ decreases and the current $i_b$ increases.

At the time $t_5$ when the two currents $i_a$ and $i_b$ become equal, the rectifying element 6 assumes the non-conductive condition, and the rectified current commutates to the rectifying element 7. This condition continues in a period $t_5$ to $t_6$. At the time $t_6$, the operation condition of this apparatus returns to the condition of the time $t_1$. The above description relates mainly to the rectifying circuit for the rectifying element 6. The operation of the rectifying circuit for the rectifying element 7 is carried out similarly with a time delay of one half period of the alternating current to be rectified. Accordingly, detailed description thereof is omitted.

In an actual apparatus, since there exist ohmic resistances of the reactors 9, 15, 10 and 16 which have been neglected in the above description, the voltage $e_1$ is still higher than the voltage $E_o$ in the period $t_2$ to $t_4$, and the current $i_a$ still decreases in the period $t_5$ to $t_6$. These undesirable phenomena can be removed by establishment of the voltage $E_s$ of the source 21 at an appropriate value similarly as in the case illustrated in FIG. 1. Of course, the output voltage of this apparatus can be regulated by controlling the voltage of the source 21.

Figure 6:
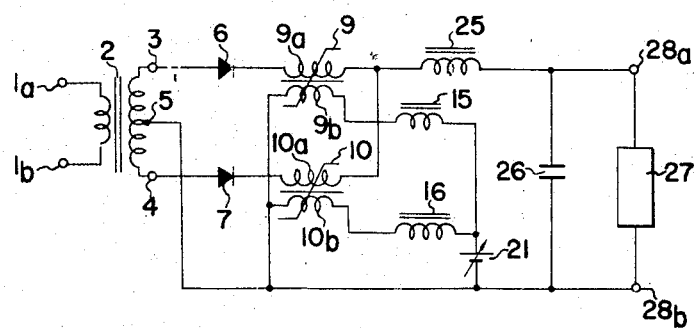

FIG. 6 shows a modification of the embodiment illustrated in FIG. 4. In this modification, main saturable reactors 9 and 10 have respectively auxiliary windings $9_b$ and $10_b$ other than main windings $9_a$ and $10_a$. Demagnetization currents of the saturable reactors 9 and 10 required during the non-conductive period of the rectifying elements 6 and 7 are supplied through by-pass circuits respectively including the auxiliary windings $9_b$ and $10_b$. Accordingly, the demagnetization quantities of the reactors 9 and 10 can be indirectly regulated by controlling loop currents $i_1$ and $i_2$. In this embodiment, characteristics and components of the control circuits can be designed by appropriately selecting the turn ratios of windings ($9_a$ and $9_b$) and ($10_a$ and $10_b$) of the reactors 9 and 10.

A modification circuit with like function can be designed by providing, respectively in the reactors 15 and 16, auxiliary windings which are respectively coupled to the reactors 9 and 10 instead of such auxiliary windings $9_a$ and $10_a$.

In above described embodiments of the invention, the voltage of the source 21 is lower than several percent of the rectified output voltage $E_o$. Moreover, the reactors 9 and 10 can be formed by the use of cut magnetic cores. Accordingly, a high power rectifying device can be easily constructed, and its output voltage can be regulated by a small power of a reference direct-current voltage source, such as the source 21.

Figure 7:
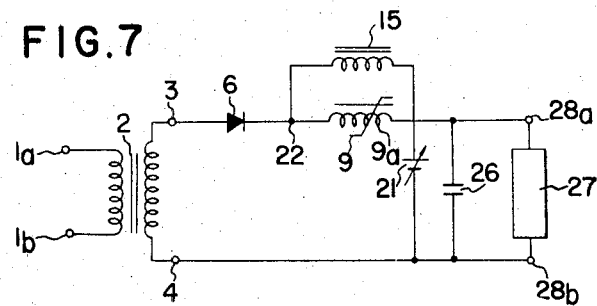
Figure 8:
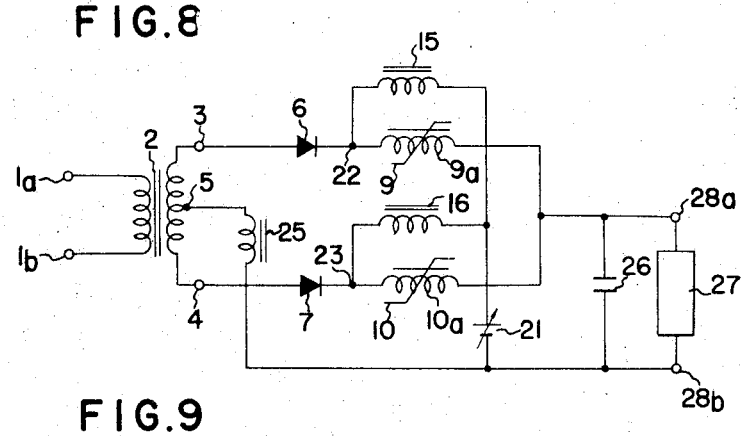
Figure 9:
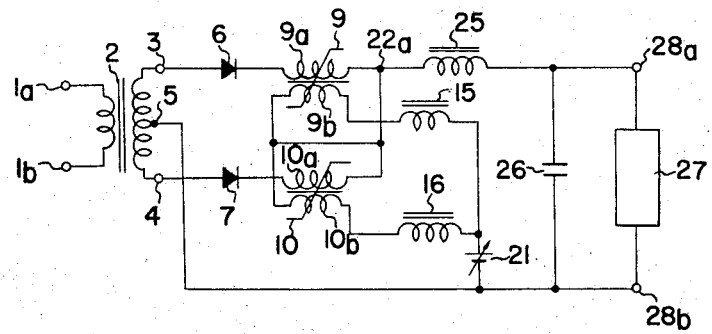

FIGS. 7, 8 and 9 show modifications of embodiments respectively illustrated in FIGS. 1, 4 and 6. Each of the rectified outputs of these rectifying circuits is regulatable at a substantially constant voltage irrespective of deviation of the input alternating-current voltage. The reason for this is that the said loop current or currents ($i_1$ and $i_2$) is/are stable when the rectified output voltage is equal to the voltage $E_{sa}$ of the reference direct-current voltage source 21. If the rectified output voltage $E_o$ increases or decreases, the loop current [or currents ($i_1$ and $i_2$)] will deviate so as to decrease the difference between the voltages $E_o$ and $E_{sa}$. In the embodiment shown in FIG. 9, if a voltage proportional to a voltage appearing at terminals $22_a$ and $28_b$ is applied to the said respective control circuits, the voltage $E_o$ of the rectified ouput will be stabilized at a value proportional to the voltage $E_s$ of the source 21.

Figure 10:
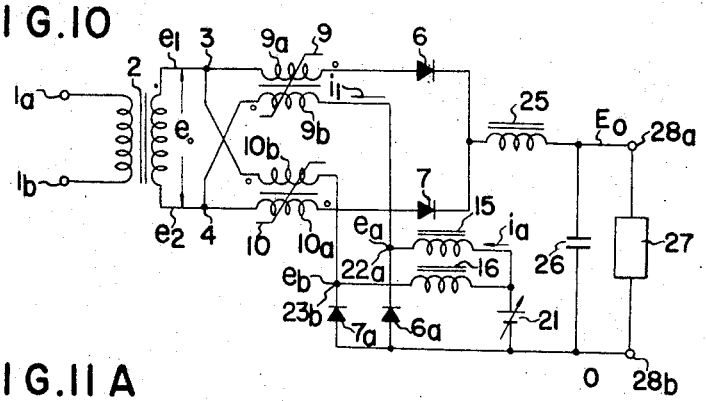
Figure 11A:
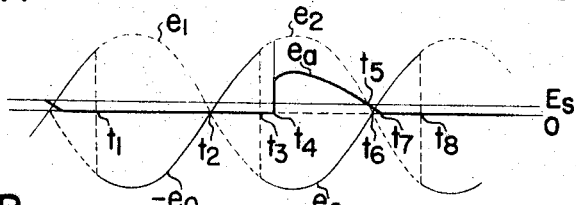
Figure 11B:
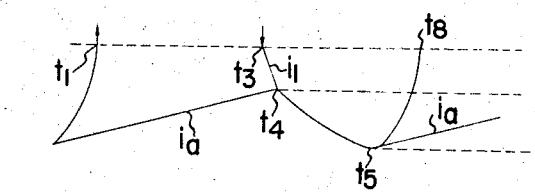

FIG. 10 is a schematic connection diagram of the bridge-type rectifying apparatus applied to full wave rectification of a single-phase alternating current. In this circuit, two saturable reactors 9 and 10 are each provided with two main windings [($9_a$ and $9_b$) or ($10_a$ and $10_b$)]. These two main windings [($9_a$ and $9_b$) or ($10_a$ and $10_b$)] are respectively connected to two terminals 3 and 4 for supplying the alternating current to be rectified. Said four windings $9_a$, $9_b$, $10_a$ and $10_b$ and four rectifying elements 6, $6_a$, 7 and $7_a$ are respectively connected to one another and form a bridge type rectifying circuit as shown in FIG. 10. Said windings of the reactors 9 and 10 have substantially the same turn number and winding polarities as shown, and the magnetization characteristics of these reactors 9 and 10 are non-rectangular as indicated in FIG. 2. Two control circuits each composed of a non-saturable reactor 15 (or 16) and a direct-current voltage source 21 connected in series are respectively connected in parallel with the rectifying elements $6_a$ and $7_a$. The rectified current is supplied, through a smoothing circuit comprising a reactor 25 and a capacitor 26, to a load 27. The rectified output voltage of this apparatus can be regulated at a substantially constant value irrespective of deviation of the input alternating-current voltage. The operation of this embodiment will be described below with reference to the waveforms of voltages and currents shown in FIGS. 11A and 11B.

First, it is assumed that the reactor 9 is saturated at a time $t_1$, and the rectified current flows through the rectifier elements 6 and $6_a$. Since the electric potential $e_a$ of a junction $22_a$ is equal to zero in a period in which the rectifier element $6_a$ is conductive, the current $i_a$ of the reactor 15 increases on because of the voltage $E_s$ of the source 21. After a time $t_2$ when a voltage $e_1$ of the terminal 3 becomes zero and a voltage $e_2$ of the terminal 4 becomes value ($-e_1$), the rectifying elements 7 and $7_a$ become conductive, so that the magnetization current of the reactor 10 flows through the winding $10_a$, the rectifying element 7, the reactor 25, the load 27, the rectifying element $7_a$ and the winding $10_b$.

At a time $t_3$ when the saturable reactor 10 is saturated, the rectified current flows through the rectifying elements 7 and $7_a$. After the time $t_3$, the rectifying elements 6 and $6_a$ are still conductive since the magnetization current of the reactor 9 is flowing through these rectifying elements. At a time $t_4$ when the current $i_1$ becomes equal to the current $i_a$, the rectifying elements 6 and $6_a$ become non-conductive, and the rectified current commutates completely to the rectifying elements 7 and $7_a$. After the time $t_4$, a difference voltage between the voltage $e_2$ and the voltage $E_s$ is applied to the winding $9_b$ and the reactor 15 connected in series. The reactor 9 is demagnetized by a current flowing with the difference voltage. This condition continues to a time $t_5$ when the voltage $e_2$ becomes equal to the voltage $E_s$.

After the time $t_5$, the magnetization current $i_1$ increases since the voltage $E_s$ becomes higher than the voltage $e_2$ in this period. The rectifying elements 6 and $6_a$ become conductive at a time $t_6$, and the voltage $e_e$ becomes zero at a time $t_7$. Accordingly, the current $i_1$ increases rapidly. At a time $t_8$ when the current $i_1$ assumes a value $i_s$, the saturable reactor 9 is saturated, and the rectified current commutated to the rectifying elements 6 and $6_a$. The above described operation is repeated in each period of the alternating current.

The reason why a substantially constant voltage of the rectified output can be obtained irrespective of deviation of the alternating current voltage will now be described. For simple description, the following references are employed.

$K_1$: the area of the rectangle enclosed with between the voltage line $E_s$ and the zero line in the period ($t_1$ to $t_4$), volt·second $K_2$: the like area in the period ($t_4$ to $t_7$), volt·second
$K_3$: the like area in the period ($t_7$ to $t_8$), volt·second
$x$: the area enclosed between the voltage line $e_2$ and the zero line in the period ($t_3$ to $t_4$), volt·second
$A$: the area enclosed between the voltage line ($-e_0$) and the zero line in the period ($t_2$ to $t_4$), volt·second
$M$: the area enclosed between the voltage line ($-e_0$) and the zero line in the period ($t_2$ to $t_6$):(volt·second of the voltage $e_0$ over one half period thereof)
$B$: the area enclosed between the voltage line $e_2$ and the zero line in the period ($t_6$ to $t_7$)
$P$: $e_2/e_a$
$T$: the period of the alternating current In the normal condition, the demagnetization and magnetization quantities with respect to the reactor 15 are equal to each other, so that the following equation is valid.

$$K_1 + K_3 = P(M - A - x - B - K_2) \quad (1)$$

With respect to the reactor 9, the following equation is valid.

$$A - B = x + (1-P)(M - A - x - B - K_2) \quad (2)$$

In the case of addition of the above two equations, $$K_1 + K_3 + A - B = x - (M - A - x - B - K_2)$$

Then, $$2A = M - (K_1 + K_2 + K_3) \quad (3)$$

On the other hand, since the rectified output voltage corresponds to the average of voltages $e_1$ and $e_2$ (which are continuously illustrated by dotted lines in FIG. 11A), the following relationship exists.

$$E_o = 2(M - 2A)/T \quad (4)$$

From Equation 3, $$E_o = 2(K_1 + K_2 + K_3)/T = 2E_s \quad (5)$$

Equation 5 does not include the reference M representative of a quantity which varies in accordance with deviation of the alternating current voltage. Accordingly, the rectified output voltage $E_o$ is steadily equal to a value $2E_s$ irrespective of deviation of the alternating current.

Figure 12:
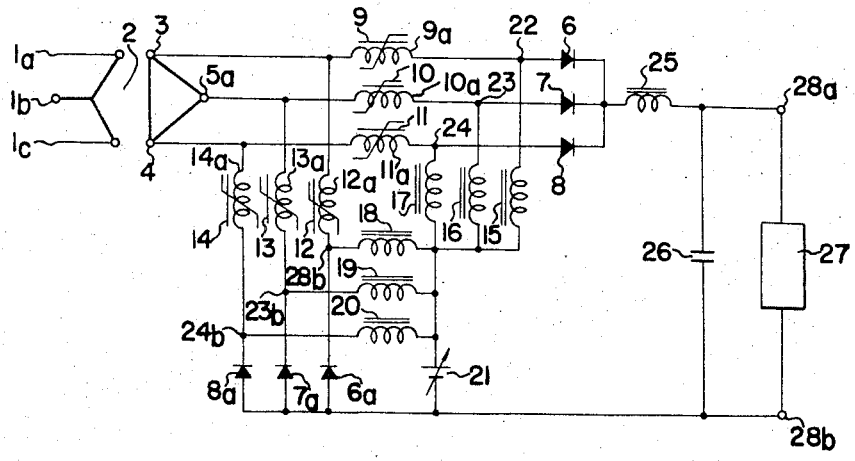

FIG. 12 is a schematic connection diagram of the rectifying apparatus according to the invention applied to full-wave rectification of a three-phase alternating current. In this embodiment, six saturable reactors 9, 10, 11, 12, 13, and 14 are respectively connected to six rectifying elements 6, 7, 8, $6_a$, $7_a$, and $8_a$. These six series connections are connected to terminals 3, 4, and $5_a$ so as to form the full-wave rectification circuit shown in FIG. 12. Six control circuits respectively composed of non-saturable reactors 15, 16, 17, 18, 19 and 20 and a direct-current voltage source 21 are respectively connected in parallel with the rectifying elements 6, 7, 8, $6_a$, $7_a$, and $8_a$. Each of the control circuits magnetizes the corresponding reactor (9, 10, 11, 12, 13 or 14) at the non-conductive condition of respective rectifying element. This rectifying apparatus so operates that the rectified current commutates successively among three sets of rectifying circuits respectively connected to the terminals 3, 4, and $5_a$. The rectified output voltage of this apparatus has a substantially constant voltage. Detailed description thereof is omitted since the principle can be easily understood on the analogy of the operation of the apparatus shown in FIG. 10.

In the embodiments shown in FIGS. 1, 4, and 6, the smoothing circuit may be cancelled if the load does not require a smoothed direct current. Of course, a smoothing circuit of any type, such as that of the capacitor input type or the choke input type, can be employed in all embodiments. When the smoothing circuit is removed in the embodiment shown in FIGS. 7, 8, 9, 10 or 12, the rectified output having a substantially constant average value is supplied to a load. The reason therefor can be described as follows. Volt-second areas over each half period of the alternating current across a reactor, such as a saturable reactor, non-saturable reactor or transformer etc., are of positive or negative, but are of the same magnitude. Accordingly, the average value of the voltage across such a reactor is equal to zero, and the average voltage of the rectified output is substantially proportional to or equal to the voltage of the reference direct-current voltage or twice the value thereof since the ohmic resistances of such reactors and the forward impedances of the rectifying elements are very small so as to be negligible.

Since it is obvious that many changes and modifications can be made in the above described details without departing from the nature and spirit of the invention, it is to be understood that the invention is not to be limited to the details described herein except as set forth in the appended claims.

What I claim is:

1. A regulatable rectifying apparatus, comprising a rectifying circuit for producing a rectified direct-current output from an alternating current supply, said rectifying circuit comprising a series connection of a rectifying element and a main saturable reactor having a cut core, and a control circuit, which is composed of a series connection of a non-saturable reactor and a direct-current voltage source having a small internal resistance, said control circuit forming a by-pass circuit for supplying a demagnetization current of the main saturable reactor during a period in which the rectifying element is non-conductive, whereby the voltage of the rectified direct-current output is regulatable by controlling the voltage of the direct-current voltage source.

2. An apparatus according to claim 1, in which the control circuit is connected in parallel with the main saturable reactor.

3. An apparatus according to claim 1, in which the control circuit is inserted between one of output terminals of the rectified output and a junction between the rectifying element and the main saturable reactor.

4. A regulatable rectifying apparatus, comprising a plurality of rectifying circuits for producing a rectified output from an alternating-current supply, each of said rectifying circuits comprising a series connection of a rectifying element and a main saturable reactor having a cut core, and a plurality of control circuits, for respective rectifying circuits, each of which control circuits is composed of a series connection of a non-saturable reactor and a direct-current voltage source having a small internal resistance and forms a by-pass circuit for supplying a demagnetization current of the respective main saturable reactor during a period in which the rectifying element is non-conductive, whereby the voltage of the rectified direct-current output is regulatable by controlling the voltage of the direct-current voltage source.

5. An apparatus according to claim 4, in which each of the control circuits is connected in parallel with the respective main saturable reactor.

6. An apparatus according to claim 4, in which each of the control circuits is connected in parallel with the respective rectifying element.

7. An apparatus according to claim 4, in which each of the control circuits is inserted between one of output terminals of the rectified output and a respective junction between the rectifying element and the main saturable reactor.

8. A regulatable rectifying apparatus, comprising at least one rectifying circuit, for producing a rectified direct-current output from an alternating-current supply, said rectifying circuit comprising a series connection of a rectifying element and a main saturable reactor having a cut core, and at least one control circuit, for a respective rectifying circuit, which control circuit is composed of a series connection of a non-saturable reactor, an auxiliary winding wound on the respective main saturable reactor, and a direct-current voltage source having a small internal resistance and forms a by-pass circuit for supplying a demagnetization current of the respective main saturable reactor during a period in which the rectifying element is non-conductive, whereby the voltage of the rectified direct-current output is regulated by controlling the voltage of the direct-current voltage source.

9. An apparatus according to claim 8, in which said components of the control circuit are formed into a ring connection.

10. An apparatus according to claim 8, in which the control circuit is inserted between one of output terminals of the rectified output and a junction between the other of the rectified output terminals and a reactor employed as a choke coil of a choke input type smoothing circuit.

11. A regulatable rectifying apparatus, comprising a rectifying circuit comprising four rectifying elements and two main saturable reactors each having two windings, which are respectively connected to two terminals of a single-phase alternating-current supply, and having a cut core, said four rectifying elements and said four windings being formed into a bridge, and two control circuits each of which is composed of a series connection of a non-saturable reactor and a direct-current voltage source having a small internal resistance, each of the control circuits being connected in parallel with the rectifying element of the same sense and forming a by-pass circuit for supplying a demagnetization current of the respective main saturable reactor during a period in which the rectifying element is non-conductive, whereby the voltage of the rectified-current output is regulated by controlling the voltage of the direct-current voltage source.

12. A regulatable rectifying apparatus, comprising at least one rectifying circuit for producing a rectified direct-current output from an alternating current supply, said rectifying circuit comprising a series connection of a rectifying element and a main saturable reactor having a cut core, and at least one control circuit which is composed of a series connection of a non-saturable reactor and a direct-current voltage source having a small internal resistance, said control circuit forming a by-pass circuit for supplying a demagnetization current of the main saturable reactor during a period in which the rectifying element is non-conductive, whereby the voltage of the rectified direct-current output is regulatable by controlling the voltage of the direct-current voltage source.

References Cited

UNITED STATES PATENTS

| | | | |
|---|---|---|---|
| 2,843,818 | 7/1958 | Mintz et al. | 321—16 |
| 3,274,479 | 9/1966 | Kurimura et al. | 321—25 |

JOHN F. COUCH, *Primary Examiner.*

W. H. BEHA, *Assistant Examiner.*